United States Patent [19]

Nusz et al.

[11] Patent Number: 5,333,636
[45] Date of Patent: Aug. 2, 1994

[54] CONTROLLED HIGH PRESSURE RELIEF FOR SMALL VOLUMES

[75] Inventors: Bary J. Nusz; Robert K. Payne; Leslie A. Perez, all of Duncan, Okla.

[73] Assignee: Halliburton Company, Duncan, Okla.

[21] Appl. No.: 93,411

[22] Filed: Jul. 15, 1993

Related U.S. Application Data

[62] Division of Ser. No. 46,257, Apr. 13, 1993, Pat. No. 5,269,341.

[51] Int. Cl.⁵ .............................................. G05D 16/20
[52] U.S. Cl. ................................................ 137/12; 137/14
[58] Field of Search ................. 137/12, 14, 487.5, 571, 137/624.18; 222/450-453

[56] References Cited

U.S. PATENT DOCUMENTS

| | | | |
|---|---|---|---|
| 1,783,163 | 11/1930 | Griswold, Jr. | |
| 2,527,136 | 10/1950 | Kagi | 222/450 X |
| 2,846,118 | 8/1958 | Matejka | 222/450 X |
| 3,072,302 | 1/1963 | Giovannoni et al. | 222/442 |
| 3,082,913 | 3/1963 | Olenik | 222/70 |
| 3,516,429 | 6/1970 | Sandstede | 137/12 X |
| 3,525,596 | 8/1970 | Grant, Jr. | 23/290 |
| 3,780,761 | 12/1973 | Whitson et al. | 137/565 |
| 4,019,524 | 4/1977 | Whitson et al. | 137/14 |
| 4,504,194 | 3/1985 | Holden | 137/571 X |
| 4,575,313 | 3/1986 | Rao et al. | 417/26 |
| 4,622,846 | 11/1986 | Moon, Jr. et al. | 73/59 |
| 4,648,264 | 3/1987 | Freese et al. | 73/64.1 |
| 4,917,349 | 4/1990 | Surjaatmadja et al. | 251/63 |
| 5,149,507 | 9/1992 | Ellis, Jr. | 422/112 |

*Primary Examiner*—Robert G. Nilson
*Attorney, Agent, or Firm*—Stephen R. Christian; E. Harrison Gilbert, III

[57] ABSTRACT

A system and method for reducing pressure in a container pressurized with a fluid provided to the container from a pressurizing fluid source communicate the pressurizing fluid with a receptacle between two valves, close a first one of the valves so that a portion of the pressurizing fluid is contained in the receptacle, and open a second one of the valves so that at least part of the portion of the pressurizing fluid is released from the receptacle.

8 Claims, 1 Drawing Sheet

CONTROLLED HIGH PRESSURE RELIEF FOR SMALL VOLUMES

This is a divisional of copending application Ser. No. 08/046,257 filed on Apr. 13, 1993, now U.S. Pat. No. 5,269,341.

BACKGROUND OF THE INVENTION

This invention relates generally to a system and method for reducing pressure in a container pressurized with a fluid provided to the container from a pressurizing fluid source. In a particular aspect, the invention relates to a system and method for testing a test fluid under pressure in a laboratory, wherein the pressure can be decreased in small increments.

In the oil and gas industry cement slurries are pumped into well bores for various reasons, one of which is for cementing casing. Different well bores can have different temperature and pressure conditions which can affect different cement slurries; therefore, it is desirable to be able to test a particular cement slurry for its suitability for a particular well bore environment. Such testing is well known in the industry.

A typical cement test occurs in a closed container to which heat can be applied to heat a sample of the cement to a desired temperature (e.g., 27°–205° C). The contents of the closed container are also maintained under pressure (e.g., 500–20,000 psi). The temperature and pressure are typically those anticipated to be encountered downhole. This type of testing device includes autoclaves. Specific examples of such test equipment are the Halliburton Services Cement Consistometer and the Halliburton Services Ultra-sonic Cement Analyzer.

In such high pressure devices, there has been a need for a pressure limiting mechanism to limit pressure increases such as result from temperature increases brought about by the heating which is typically performed at the beginning of a test. This pressure limiting has been done by a technician monitoring a pressure gauge and manually opening a valve to relieve pressure. A preferable way would be to use a valve which would automatically release a limited volume of pressurized fluid from the test container to produce a drop in pressure when the pressure reaches a predetermined level. This would require a controllable relief valve, but relief valves which are rated at 20,000 pounds per square inch (psi), which is a typical pressure rating on cement testing equipment of the type mentioned hereinabove, are not common, and those presently available typically relieve a much larger volume than is acceptable to maintain sufficient pressure to continue the desired cement test in the example of the Halliburton Services Ultra-sonic Cement Analyzer.

One valve which has a suitable pressure rating is available from Autoclave Engineers. In a test using this valve, it was determined that the valve reaction time was not acceptable and that too much pressure was relieved from the same cement testing container such as is used in the aforementioned Ultra-sonic Cement Analyzer. We also believe that the large mass of the piston and inherent friction of the packing seal of the Autoclave Engineers valve would be detrimental to the accurate control needed with the particular type of cement testing equipment referred to hereinabove.

Another valve that has been proposed for controlling pressure is disclosed in U.S. Pat. No. 4,917,349 to Surjaatmadja et al. Although this valve has proved useful in some applications, it also has a response that can be too slow for small volume, high pressure applications. That is, when it is opened it releases too much pressure before it can be re-closed even though closure can occur within less than a second. This not only results in erroneous pressure control, but also the cement or other test fluid can be expelled into attached plumbing due to the rapid depressurization.

Because such valves as referred to above are alone not fast enough to release sufficiently small volumes of high pressure fluid to properly control the pressure in small volume, high pressure containers such as are used in the Ultra-sonic Cement Analyzer, there is the need for an improved system and method by which such control can be obtained.

SUMMARY OF THE INVENTION

The present invention overcomes the above-noted and other shortcomings of the prior art by providing a novel and improved system and method for reducing pressure in a container pressurized with a fluid provided to the container from a pressurizing fluid source. An advantage of the present invention is that it can be used to release different selected amounts of pressurized fluid and thereby reduce pressure in a connected container in a selected desired pressure increment. These increments can be substantially smaller than the smallest increment that can be obtained using one of the prior valves by itself. Thus, the present invention allows only desired (typically, small) amounts of pressure to be released so that it prevents total depressurization.

The present invention provides a system for reducing pressure in a container pressurized with a fluid provided to the container from a pressurizing fluid source. This system comprises: a first valve having an inlet connected to the container in communication with the pressurizing fluid in the container; a receptacle having a predetermined volume, which receptacle has an inlet connected to an outlet of the first valve; a second valve having an inlet connected to an outlet of the receptacle; and means, responsive to a desired pressure and an actual pressure in the container, for operating the first valve and the second valve so that in response to the actual pressure exceeding the desired pressure the first valve is closed after pressurizing fluid is received in the predetermined volume of the receptacle and then the second valve is opened to release pressurizing fluid from the predetermined volume of the receptacle through an outlet of the second valve and then the second valve is closed and the first valve opened.

The present invention also provides a method of reducing pressure in a container pressurized with a fluid provided to the container from a pressurizing fluid source. The method comprises: (a) communicating the pressurizing fluid with a receptacle between two valves; (b) closing a first one of the valves so that a portion of the pressurizing fluid is contained in the receptacle; and (c) opening a second one of the valves so that at least part of the portion of the pressurizing fluid is released from the receptacle under action solely of the pressurizing fluid in the receptacle upon the opening of such second valve.

Although the present invention has broader application, it is particularly useful in controllably reducing high pressure in a small volume container wherein the high pressure containing volume is less than 100 cubic centimeters, such as is found when testing a test fluid under pressure in a laboratory (e.g., in an autoclave of a consistometer).

Therefore, from the foregoing, it is a general object of the present invention to provide a novel and improved system and method for reducing pressure in a container pressurized with a fluid provided to the container from a pressurizing fluid source. Other and further objects, features and advantages of the present invention will be readily apparent to those skilled in the art when the following description of the preferred embodiment is read in conjunction with the accompanying drawings.

DETAILED DESCRIPTION OF PREFERRED EMBODIMENT

Figure 1:
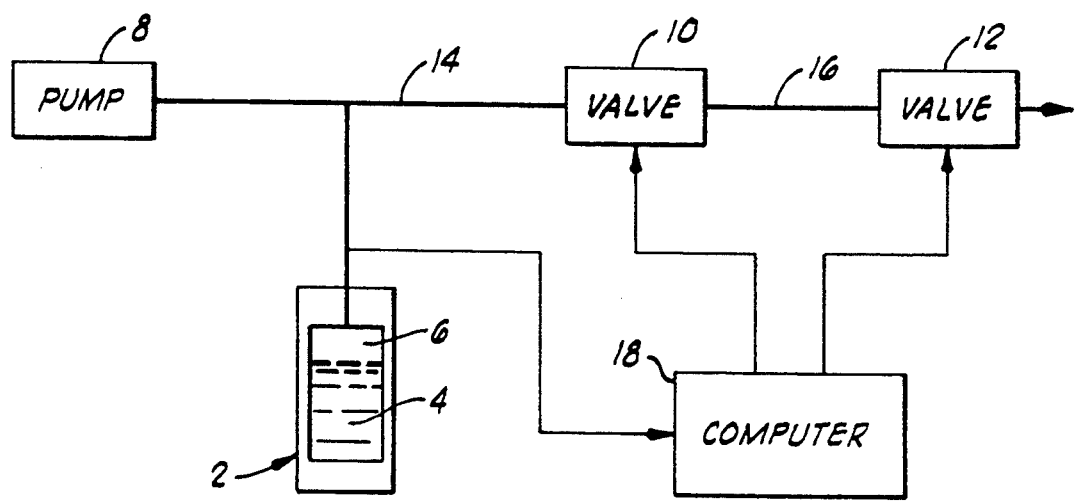
FIG. 1 is a block diagram of the system of the present invention.

The system for reducing pressure in a container pressurized with a fluid provided to the container from a pressurizing fluid source is depicted in FIG. 1. A container 2 provides a chamber that contains a material 4 to be tested under pressure. The pressure is provided by a compressible pressurizing fluid 6 pumped into the container 2 by a pump 8. In the preferred embodiment, the container 2 is an autoclave, such as used in the Halliburton Services Ultra-sonic Cement Analyzer, wherein a cement slurry to be used in an oil or gas well can be tested in a laboratory where the autoclave is located. The pressurizing fluid 6 can be any suitable substance known in the art. Water is the preferred pressurizing fluid 6 because it is slightly compressible at high pressures. Likewise, the pump 8 is also of a type as known in the art, such as one used in the aforementioned Ultrasonic Cement Analyzer. See, for example, U.S. Pat. No. 4,622,846 to Moon, Jr et al and U.S. Pat. No. 4,648,264 to Freese et al., both incorporated herein by reference. Other types of pressurizing fluid sources can be used, as can other types of containers.

Although the present invention can be used in other applications, it especially meets the need for a system and method for reducing high pressure in small increments from a container wherein the volume for receiving the pressurizing fluid 6 is less than 100 cubic centimeters. Thus, "small volume" as used herein and in the claims means less than 100 cubic centimeters.

Gradual pressure relief of the high pressure container 2 is accomplished with the use of two valves 10, 12. Each valve can be of a suitable type, but a preferred embodiment is the high-speed, hydraulic needle valve disclosed in U.S. Pat. No. 4,917,349 to Surjaatmadja et al. referred to hereinabove and incorporated herein by reference.

The valve 10 is connected in series with the container 2 through a conduit 14 which, as shown in FIG. 1, connects the pressurizing volume of the container 2, the output of the pump 8 and the inlet of the valve 10.

The valve 12 is connected in series with the valve 10 through a conduit 16 connecting the outlet of the valve 10 with the inlet of the valve 12. The valve 12 has an outlet communicating with ambient atmosphere or other environment that is at a lower pressure than is in the container 2 and the conduit 16.

The conduit 16 can also be referred to as a receptacle having an inlet connected to the valve 10 and an outlet connected to the valve 12. Although such a receptacle 16 can be selected as having any desired hollow internal volume, once selected in a particular implementation, the volume is thereby predetermined and preferably fixed. When used with small volumes as defined herein, the hollow internal volume of the receptacle 16 is preferably less than 1 cubic centimeter. A specific implementation of the receptacle 16 is a straight high pressure metal tubing having a length of about 15 centimeters and an inner diameter of about 0.21 centimeter.

To operate the valves 10 and 12, the system of the present invention includes a computer 18 which responds to the pressure in the container 2 (specifically, the pressure of the pressurizing fluid 6) and compares this to a predetermined desired pressure that has been entered in the computer 18. If the computer 18 determines that the actual pressure is greater than the desired pressure, the computer 14 will generate and send an electrical signal to open the valve 12 after first generating and sending a separate electrical signal to close the valve 10. The fluid in the conduit 16 thereby becomes unpressurized and decompresses by expelling at least a portion of itself from the conduit 16 through the opened valve 12. This occurs under action solely of the pressurizing fluid in the receptacle 16 upon the opening of the valve 12. That is, due to the pressure differential between the fluid in the conduit 16 and the lower pressure environment at the outlet of the valve 12, venting automatically occurs without the need of any additional force.

After waiting a sufficient time (e.g., less than 1 second), the computer 18 then generates and sends an electrical signal to close the valve 12 and it generates and sends a separate control signal to open the valve 10. The fluid in the conduit 16 then again becomes pressurized and compresses by accepting more fluid 6 from the container 2. The computer 18 repeats this process until the measured, actual pressure in the container 2 is within a predetermined tolerance of the desired pressure.

The amount of pressure dropped during each cycle can be customized by changing the length and/or diameter of the receptacle 16 (more generally, by changing the internal volume that receives pressurizing fluid). The larger the storage volume of the receptacle 16, the more fluid can be decompressed during each cycle and the greater the pressure drop that can be obtained. Conversely, the smaller the internal volume of the receptacle 16, the smaller the pressure drop.

Temperature can also affect the amount of pressure dropped during each cycle. For example, in the case of water being used as the pressurizing fluid, if the temperature is above 100° C. then upon depressurization via the receptacle 16, most of the fluid will be expelled. This will increase the amount of pressure dropped during each cycle; however, this can be minimized by, for example, making the depressurization/pressurization cycle as fast as possible as controlled by the computer 18.

Figure 2:
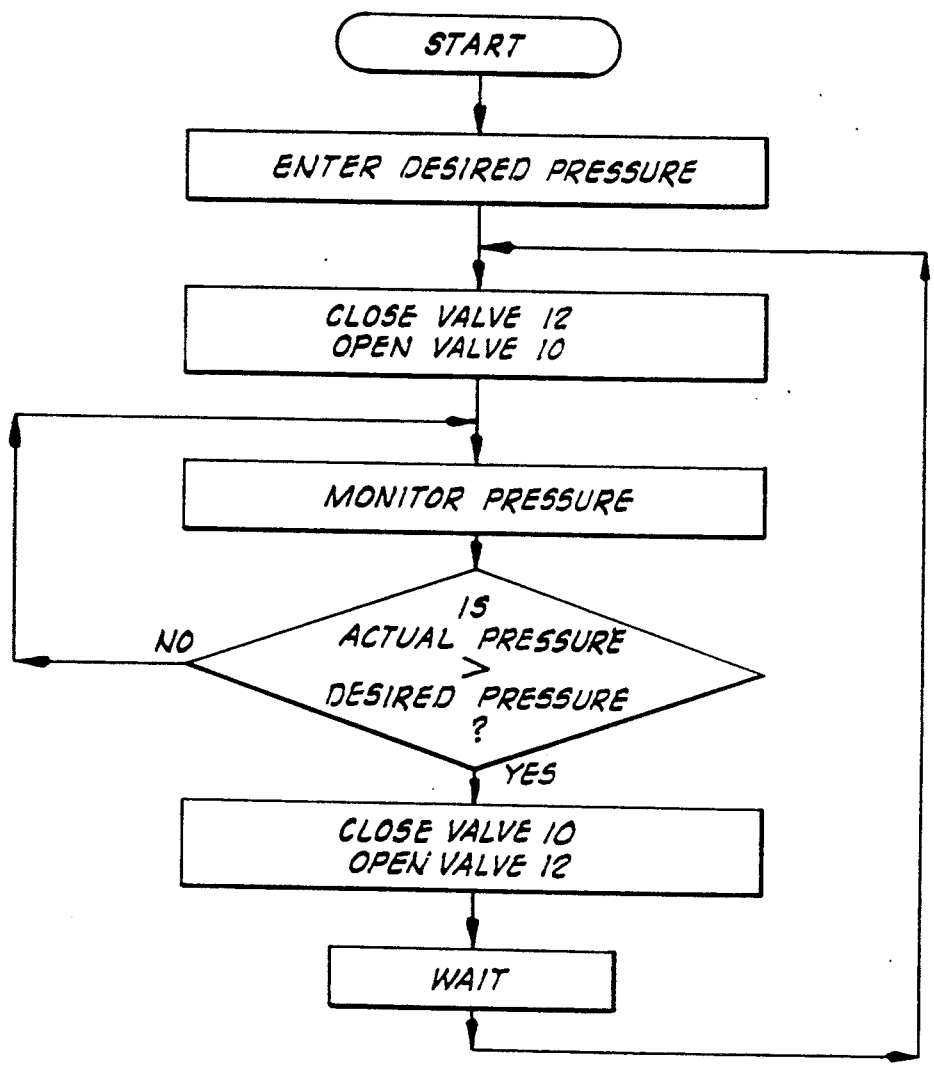
FIG. 2 is a flow chart for a program for programming a computer that can be used in implementing the system and method of the present invention.

The computer 18 can be implemented by any suitable device, and it can even be replaced by a non-computer circuit, device or system designed to obtain the same control as preferably implemented with the computer 18. It is, however, presently contemplated that the preferred embodiment is a programmed digital computer comprising means for comparing the actual pressure with the desired pressure, means for generating the respective control signals for the valve 10 in response to the means for comparing, and means for generating the respective control signals for the valve 12 in response to the means for comparing. A specific implementation can be made using a Halliburton Services UNI-PRO II computer additionally programmed in accordance with the self-explanatory flow chart of FIG. 2 that can be readily coded in a suitable programming language as known in the art.

In accordance with the foregoing, the present invention provides a method of reducing pressure in the container 2 that is pressurized with the fluid 6 provided to the container 2 from a pressurizing fluid source shown in FIG. 1 as implemented using the pump 8. As previously mentioned, the container 2 is preferably adapted to receive less than 100 cubic centimeters of the pressurizing fluid 6 and the receptacle 16 is preferably adapted to receive less than 1 cubic centimeter of the pressurizing fluid. The container 2 is preferably adapted to receive pressurizing fluid up to a pressure of 20,000 pounds per square inch and the receptacle 16 is preferably sized so that actual pressure in the container 2 is reduced not more than 500 pounds per square inch during any one pressure relief cycle.

The method comprises communicating the pressurizing fluid 6 with the receptacle 16 between the two valves 10, 12. This includes first closing the valve 12 and then opening the valve 10.

The method further comprises then closing the valve 10 so that a portion of the pressurizing fluid 6 is contained in the receptacle 16. Valve 10 closure is obtained by generating a control signal and communicating it to the valve 10. Using the FIG. 1 system, this is done by the programmed computer 18.

The method also comprises opening the valve 12 so that at least part of the portion of the pressurizing fluid 6 is released from the receptacle 16 under action solely of the pressurizing fluid 6 in the receptacle 16 upon the opening of the valve 12. Opening of the valve 12 occurs by generating a control signal, separate from the signal for the valve 10 so that the valves 10, 12 operate independently of each other, and communicating this control signal to the valve 12. Using the FIG. 1 system, this other control signal is also provided by the programmed digital computer 18, which responds to a difference between actual and desired pressures of the pressurizing fluid 6 in the container 2.

In the event that a single pressure relief cycle as just described does not reduce the pressure in the container 2 enough, the method further comprises repeating the aforementioned steps until the actual pressure of the pressurizing fluid 6 in the container 2 is not greater than the desired pressure (or is otherwise within an acceptable tolerance of the desired pressure).

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. A method of reducing pressure in a container pressurized with a fluid provided to the container from a pressurizing fluid source, said method comprising:
    (a) communicating the pressurizing fluid with a receptacle between an opened first valve and a closed second valve;
    (b) closing the first valve so that a portion of the pressurizing fluid is contained in the receptacle; and
    (c) opening the second valve so that at least part of the portion of the pressurizing fluid is released from the receptacle under action solely of the pressurizing fluid in the receptacle upon the opening of the second valve;
    (d) repeating steps (a), (b), and (c) until an actual pressure of the pressurizing fluid in the container is not greater than a desired pressure.

2. A method as defined in claim 1, wherein said step (b) includes generating a first control signal and communicating the first control signal to the first valve and said step (c) includes generating a second control signal and communicating the second control signal to the second valve so that the first and second valves are separately controlled.

3. A method as defined in claim 2, wherein the first and second control signals are generated using a programmed digital computer responding to a difference between actual and desired pressures of the pressurizing fluid in the container.

4. A method as defined in claim 1, wherein the receptacle has a fixed predetermined volume of less than 1 cubic centimeter for receiving the portion of the pressurizing fluid.

5. A method as defined in claim 1, wherein the container is adapted to receive less than 100 cubic centimeters of the pressurizing fluid.

6. A method as defined in claim 5, wherein the receptacle is adapted to receive less than 1 cubic centimeter of the pressurizing fluid.

7. A method as defined in claim 1, wherein the container is adapted to receive pressurizing fluid up to a pressure of 20,000 pounds per square inch and wherein the receptacle is sized so that actual pressure in the container is reduced not more than 500 pounds per square inch during said steps (b) and (c).

8. A method of reducing pressure in a container pressurized with a fluid provided to the container from a pressurizing fluid source, said method comprising:
    (a) communicating the pressurizing fluid with a receptacle between a first valve and a second valve;
    (b) generating a first control signal by using a programmed digital computer responding to a difference between actual and desired pressures of the pressurizing fluid in the container, communicating the first control signal to the first valve, closing the first valve so that a portion of the pressurizing fluid is contained in the receptacle; and
    (c) generating a second control signal by using a programmed digital computer responding to a difference between actual and desired pressures of the pressurizing fluid in the container, opening the second valve so that at least the portion of the pressurizing fluid is released from the receptacle under action solely of the pressurizing fluid in the receptacle upon the opening of the second valve.

* * * * *